Patented Feb. 19, 1935

1,991,810

UNITED STATES PATENT OFFICE 1,991,810

MANUFACTURE OF ARTIFICIAL MATERIALS

Leon Lilienfeld, Vienna, Austria

No Drawing. Application September 1, 1931, Serial No. 560,657. In Austria September 2, 1930

62 Claims. (Cl. 260—3)

This invention is based on the observation that materials which are of technical value are obtained by contacting a product of the condensation of an ammonia derivative of carbon dioxide (for example urea or dicyanodiamide, see Meyer-Jacobson, "Lehrbuch der Organischen Chemie," vol. 1, part 2, pages 1368 to 1429), or of an ammonia derivative of a sulphur derivative of carbon dioxide (for example thiourea, see ibid pages 1427 to 1447) and an aldehyde (for example formaldehyde), in any stage of its production, with one or more of the bodies obtainable by the process described in my U. S. Patent 1,018,329, particularly with the body called in that specification 2-oxytrimethylene - 1.3 - sulphide (and which could also be called 2-hydroxymethylene-1.3 sulphide) or a derivative such as esters or ethers or a polymerization product thereof.

In general, products obtainable by the above treatment of the said condensation products are improved by incorporating with the product of the treatment, at any stage of its production, an ester, particularly a halogen derivative, of a dihydric or polyhydric alcohol.

In accordance with the present invention there may be produced artificial materials of various kinds, for example plastic masses, films, membranes, plates, shaped pieces, dressings, printed layers, coatings on rigid supports, such as wood, glass or the like, or on flexible supports, such as fabrics, paper, leather or the like; according to the proportion of the body or bodies obtainable by the process of Patent 1,018,329, and of the ester (if any) incorporated in the mass the products may have remarkable pliability and elasticity. By suitable choice of such proportion and of the operating conditions, (such as temperature, duration of the reaction or the like), under which the material passes from the liquid into the solid state, it is possible to obtain products exhibiting all the stages of pliability and elasticity ranging from that of brittle glass to that of celluloid, and from that of celluloid to that of rubber.

Among the ammonia derivatives of carbon dioxide, there have proved useful for the invention, for example, urea and dicyanodiamide and their derivatives; also aqueous extracts obtained from calcium cyanamide. Among the ammonia derivatives of sulphur derivatives of carbon dioxide there have proved especially useful thiourea and its derivatives.

Among the aldehydes there have proved useful for the present invention formaldehyde, polymers of formaldehyde (for example trioxymethylene, paraformaldehyde) and derivatives of formaldehyde, such as hexamethylene-tetramine, as well as acrolein.

Instead of formaldehyde and urea there may be used dimethylol-urea, that is to say dimethylol-urea may be contacted directly with one or more bodies obtainable by the process of Patent 1,018,329, with or without an ester, for example a halogen derivative, of a dihydric or polyhydric alcohol or a derivative of such a halogen derivative, such as an ether of such a halogen derivative.

The condensation may be conducted in the presence or absence of a basic condensing agent (for example ammonia, pyridine, a basic salt, an alkali or the like), or in presence of an acid condensing agent (for example a dilute inorganic acid, such as sulphuric acid, or an acid ester thereof, such as glycerine-phosphoric acid or glycerine-sulphuric acid, or an organic acid, such as tartaric acid or citric acid, or an acid salt), or also in presence of any of the known accelerators.

Furthermore, the condensation may be conducted in the presence of a phenol or a phenyl-urea or the like.

There may be incorporated in the products of the present invention, in any stage of their production, any of the softening agents or agents imparting plasticity or elasticity, which are known in the technology of artificial resins or in the literature, for example glycerine, glycol, cyclohexanol or the like. The products of the invention may also be worked up together with another colloid or colloids, such as a natural resin, rubber or the like.

The following examples illustrate the invention, the parts being by weight:—

*Example 1.*—100 parts of thiourea are mixed with 170 parts of a commercial solution of formaldehyde (of about 40 per cent. strength). To this mixture there are then added 60 parts of a product made by the process described in Patent 1,018,329 (particularly the body there referred to as 2-oxytrimethylene-1:3-sulphide); if this product is not anhydrous but contains water, it can be used in the calculated quantity corresponding with 60 parts of the dry material. The reaction mixture is then heated on a water bath to 60° C. As soon as this temperature is attained, the heating is interrupted, the clear solution is cooled to 30° C. and is maintained at this temperature for 20–26 hours.

The clear solution may be spread on a glass plate and dried at 60° C. until it is no longer adhesive and the film of material is dry to the touch. The film thus obtained is completely clear and as compared with the film that has been produced under the same working conditions but in absence of oxythimethylene sulphide is distinguished by remarkable pliability, extensibility and elasticity towards stretching or bending.

Or the solution may be concentrated under a reduced pressure at 40° C. until it is of a syrupy consistency. The clear syrup is then worked up on a glass plate into a film, or in moulds into plates or shaped articles of any desired size, the glass plate and its coating or the mold and its contents being for this purpose maintained at 60° C. until hardening occurs.

*Example 2.*—The procedure is as in Example 1, with the exception that there are used 100 parts of a product made by the process described in Patent 1,018,329.

*Example 3.*—The procedure is as in Example 1, with the exception that there are used 150 parts of a product made by the process described in Patent 1,018,329.

*Example 4.*—The procedure is as in Example 1, with the exception that there are used 200 parts of a product made by the process described in Patent 1,018,329.

*Example 5.*—The procedure is as in any of the Examples 1–4, with the exception that there are added to the reaction mixture at the commencement 12.5 parts of a solution of ammonia of 25 per cent. strength.

*Example 6.*—The procedure is as in any of the Examples 1–5, with the exception that after the reaction mixture has attained a temperature of 60° C., it is maintained for two hours at 60° C. and only then is cooled to 30° C.

*Example 7.*—The procedure is as in any of the Examples 1–6, with the exception that the hardening of the layers or shaped articles is effected at 110° C., whereby the conversion into the solid state is considerably accelerated.

*Example 8.*—100 parts of thiourea and 79 parts of urea are mixed with 340 parts of a commercial solution of formaldehyde (about 40%). To this mixture there are then added 60 parts of a product made by the process described in my Patent 1,018,329 (especially the product presumed to be 2-oxytrimethylene-1:3-sulphide); if this product is not anhydrous but contains water; it can be used in the calculated quantity corresponding with a content of dry material of 60 parts. The reaction mixture is then heated on a water bath to 40° C. As soon as this temperature is attained the heating is interrupted, the clear solution is cooled to 30° C. and maintained at this temperature for 20–26 hours.

The clear solution or the syrup obtained by concentrating the solution is worked up in the manner described in any of the preceding examples into films, plates, shaped articles, rods or the like.

*Example 9.*—The procedure is as in Example 8, with the exception that there are used 100 parts of a product made by the process described in Patent 1,018,329.

*Example 10.*—The procedure is as in Example 8, with the exception that there are used 150 parts of a product made by the process described in Patent 1,018,329.

*Example 11.*—The procedure is as in Example 8, with the exception that there are used 200 parts of a product made by the process described in Patent 1,018,329.

*Example 12.*—The procedure is as in any of the Examples 8–11, with the exception that there are added to the reaction mixture at the commencement 12.5 parts of a solution of ammonia of 25 per cent. strength.

*Example 13.*—The procedure is as in any of the Examples 8–12, with the exception that the hardening of the layers or shaped articles occurs at 110° C., whereby the conversion into the solid state is considerably accelerated.

*Example 14.*—The procedure is as in any of the Examples 1–13, with the exception that the product made by the process of Patent 1,018,329 is incorporated with the reaction mixture after condensation is complete, for example either before cooling the reaction mixture to 30° C., or directly before working up the reaction mixture into films, plates or the like.

*Example 15.*—The process is conducted as in any of the preceding examples, with the difference that 100 parts of α-dichlorhydrin are, at the beginning, added to the reaction mixture.

*Example 16.*—The process is conducted as in Example 15, with the difference that 150–200 parts of α-dichlorhydrin are, at the beginning added to the reaction mixture.

*Example 17.*—The procedure is as in either of the Examples 15 or 16, with the exception that the α-dichlorhydrin is incorporated in the reaction mixture after condensation is complete, for example either before cooling the reaction mixture to 30° C., or directly before working up the reaction mixture into films, plates or the like.

*Example 18.*—A cotton fabric is coated once or several times, by hand or by means of a spreading machine, with a condensation solution made in accordance with any of the Examples 1–17, or with a syrup obtained by concentrating such condensation solution, the solution or syrup being used alone or mixed with a filling material (for example zinc white or china clay), or with a dyestuff, or a lake, or a pigment (for example soot, ochre, mica or the like). There is thus obtained a material which is soft throughout and resembles leather; it may be calendered and/or provided, by embossing or pressing, with a suitable grain.

*Example 19.*—A condensation solution made in accordance with any of the Examples 1–17 is spun in known manner to produce artificial fibres, preferably after it has been concentrated to a syrup.

*Example 20.*—A condensation solution made in accordance with any of the Examples 1–17 is used as such or after concentration to a syrupy consistency for coating or varnishing a rigid object, such as wood, sheet metal or the like.

In the foregoing examples there may be used instead of α-dichlorhydrin an equimolecular quantity of another halogen derivative of a dihydric or polyhydric alcohol, for example ethylene - chlorhydrin, β - dichlorhydrin, α- and β-monochlorhydrin, epichlor-hydrin, mannitol - chlorhydrin, mannitol - dichlor - hydrin, pinacone-chlorhydrin, pinacone-dichlorhydrin or the like, or a derivative, for example an ether, of a halogen derivative of a dihydric or polyhydric alcohol, or another ester of a dihydric or polyhydric alcohol capable of acting as a plasticizing agent, for example diacetin or the like.

Instead of chlorine derivatives there may also be used bromine or iodine derivatives.

In the appended claims, the term "a urea" is used to designate urea, thiourea, dicyandiamide or derivatives thereof as referred to hereinabove In the U. S. Patent 1,018,329, above referred to, granted to myself on Feb. 20, 1912, is described a process of making certain sulphur derivatives of glycerine, or its polymers, by reacting upon a halohydrin (other than the trihalogenhydrin) with a solution of an alkali metal sulfid such as Na₂S. The products, especially those referred to in said prior patent (and the corresponding British Patent 25,246 of 1911) as "2-oxytrimethylene-1:3-sulphide" and "3-oxytrimethylene-1:3-sulphide" are viscous liquids insoluble in water and alcohol and having no pronounced odor, and these may polymerize to a rubbery material.

The expressions "2-oxytrimethylene-1:3 sulphide" and 3-oxytrimethylene-1:2-sulphide" used in the specification and claims are, wherever the context permits, intended to designate the products which in my U. S. Patent 1,018,329 are called 2-oxytrimethylene-1:3-sulphide or 3-oxytrimethylene-1:2-sulphide, as well as their derivatives and polymerization products.

In the appended claims the term "a formaldehyde body" is intended to embrace formaldehyde itself, its polymers and derivatives as set forth above.

In the appended claims, the term "polyhydric alcohol" is intended to cover alcohols containing a plurality of (i. e. two or more than two) OH groups.

I have purposely refrained from giving equations showing the reactions which take place, since I do not wish to limit myself to any particular theory of operation. It appears probable (or at least possible) that true condensation reactions may take place between the urea (or equivalent), the aldehyde and the sulphur derivative of glycerine, or between the urea-aldehyde condensation product and the sulphur derivative of glycerine. But at any event the latter mixes or blends thoroughly therewith to form a homogeneous mass, and whether the union is chemical or physical is immaterial.

What I claim is:—

1. A process of making an intermediate suitable for the production of artificial materials by bringing a condensation product of a urea and an aldehyde, in any stage of the production of such product, into contact with a sulphur derivative of glycerine produced by acting upon a glycerine dichlorhydrine with an inorganic sulphide.

2. A process as in claim 1, in which the sulphur derivative of glycerine used is that called 2-oxytrimethylene-1:3-sulphide.

3. A process as claimed in claim 1, wherein at least one substance selected from the group urea, thiourea and dicyanodiamide constitutes the urea used.

4. A process as claimed in claim 1, wherein at at least one substance selected from the group urea, thiourea and dicyanodiamide constitutes the urea used and wherein 2-oxytrimethylene-1:3-sulphide constitutes the sulphur derivative of glycerine used.

5. A process as claimed in claim 1, wherein the aldehyde used is a formaldehyde body.

6. A process as claimed in claim 1, wherein 2-oxytrimethylene-1:3-sulphide constitutes the sulphur derivative of glycerine used and the aldehyde used is a formaldehyde body.

7. A process of making an intermediate suitable for working into artificial materials by bringing a condensation product of a urea and an aldehyde, at any stage of its production, into contact with a glycerine sulphide which is not readily soluble in water or in alcohol.

8. Process as in claim 7 in which a member of the group consisting of 2-oxytrimethylene-1:3-sulphide, the derivatives thereof and the polymerization products thereof, constitutes the sulphur derivative employed.

9. A process as claimed in claim 7, wherein dicyanodiamide constitutes the urea used.

10. A process as claimed in claim 7, wherein the aldehyde used is a formaldehyde body.

11. A process of making an intermediate suitable for working into artificial materials by bringing dimethylol-urea into contact with a glycerine sulphide which is not readily soluble in water or in alcohol.

12. A process of making an intermediate suitable for working into artificial materials by bringing dimethylol-urea into contact with a sulphur derivative of glycerine which is produced by acting with an inorganic sulphide on a glycerine dichlorhydrine.

13. Process as in claim 11 in which the sulphur derivative is selected from the group consisting of 2-oxytrimethylene-1:3-sulphide, derivatives thereof and polymerization products thereof.

14. A process as claimed in claim 1, wherein at any stage of the production of the material containing the condensation product, there is incorporated an ester of a polyhydric alcohol, such ester being selected from the group consisting of halohydrines and acetins.

15. A process as in claim 1 in which a halogen derivative of a polyhydric alcohol is incorporated into the mass at any stage of the process.

16. A process as in claim 1 in which a halohydrin is incorporated into the mass at any stage of the process.

17. A process as in claim 1 in which a chlorhydrin is incorporated into the mass at any stage of the process.

18. A process as covered in claim 1, conducted in the presence of a phenol.

19. A process as covered in claim 1, conducted in the presence of a phenyl urea.

20. A process as covered in claim 1, conducted in the presence of a condensing agent.

21. A process as covered in claim 1, conducted in the presence of an accelerating agent.

22. A process as in claim 1, in which a dichlorohydrine of glycerine is incorporated with the mass at any stage of the process.

23. A composition of matter comprising as its characteristic ingredient, a substantial amount of a condensation product of urea and an aldehyde together with a glycerin sulphide which itself is not readily soluble in water or alcohol.

24. A composition of matter comprising as its characteristic ingredient, a substantial amount of a condensation product of (a) a substance selected from the group urea, thiourea, dicyanodiamide and (b) an aldehyde, together with a glycerin sulphide which itself is not readily soluble in water or alcohol.

25. A composition of matter comprising as its characteristic ingredient, a substantial amount of a condensation product of (a) a substance selected from the group urea, thiourea, dicyanodiamide and (b) an aldehyde, together with a halohydrine and together with a glycerin sulphide which itself is not readily soluble in water or alcohol.

26. A composition of matter comprising as its characteristic ingredient, a substantial amount of a condensation product of thiourea and an aldehyde, together with a glycerine sulphide which itself is not readily soluble in water or alcohol.

27. A composition of matter comprising as its characteristic ingredient, a substantial amount of a condensation product of a urea and an aldehyde together with a sulphur compound of glycerine selected from the herein described group consisting of

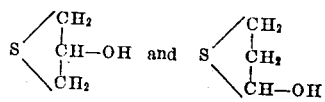

and polymerization products thereof.

28. A composition of matter comprising as its characteristic ingredient, a substantial amount of a condensation product of a urea and an aldehyde together with a halohydrine and together with a sulphur compound of glycerine selected from the herein described group consisting of

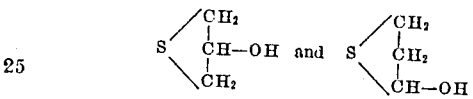

and polymerization products thereof.

29. A process as claimed in claim 1, in which the urea employed is simple urea $CON_2H_4$.

30. A process as claimed in claim 1, in which the urea employed is thiourea $CSN_2H_4$.

31. A process as claimed in claim 1, in which both urea and thiourea are reacted with the aldehyde.

32. A composition of matter comprising as its characteristic ingredient, a substantial amount of a condensation product of a urea and an aldehyde, together with 2-oxytrimethylene-1:3-sulphide.

33. A composition of matter comprising as its characteristic ingredient, a substantial amount of a condensation product of a urea and an aldehyde, together with a polymer of 2-oxytrimethylene-1:3-sulphide.

34. A composition of matter comprising as its characteristic ingredient, a substantial amount of a condensation product of a urea and an aldehyde, together with a glycerin sulphide which itself is not readily soluble in water or alcohol.

35. A composition of matter comprising as its characteristic ingredient, a substantial amount of a condensation product of (a) at least one substance selected from the group urea, thiourea, dicyanodiamide and (b) formaldehyde, together with 2-oxytrimethylene-1:3-sulphide.

36. A composition of matter comprising as its characteristic ingredient, a substantial amount of a condensation product of (a) at least one substance selected from the group urea, thiourea, dicyanodiamide and (b) formaldehyde, together with a sulphur compound of glycerine selected from the herein described group consisting of

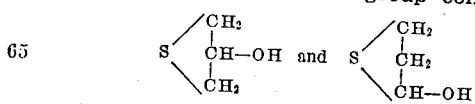

and polymerization products thereof.

37. A composition of matter comprising as its characteristic ingredient, a substantial amount of a condensation product of (a) at least one substance selected from the group urea, thiourea, dicyanodiamide and (b) formaldehyde, together with 2-oxytrimethylene-1:3-sulphide and together with a halohydrine.

38. A composition of matter comprising as its characteristic ingredient, a substantial amount of a condensation product of (a) at least one substance selected from the group urea, thiourea, dicyanodiamide and (b) formaldehyde, together with an oxytrimethylene sulphide and a chlorhydrine.

39. A composition of matter comprising as its characteristic ingredient, a substantial amount of a condensation product of urea $CON_2H_4$, thiourea and formaldehyde, together with an oxytrimethylene sulphide.

40. A composition of matter comprising as its characteristic ingredient, a substantial amount of a condensation product of urea $CON_2H_4$, thiourea and formaldehyde, together with an oxytrimethylene sulphide and a halohydrine.

41. A composition of matter comprising as its characteristic ingredient, a substantial amount of a condensation product of a urea and formaldehyde, together with a glycerin sulphide which itself is not readily soluble in water or alcohol.

42. A composition of matter comprising as its characteristic ingredient, a substantial amount of a condensation product of a urea and an aldehyde together with a glycerin sulphide which itself is not readily soluble in water or alcohol and a halohydrin.

43. A composition of matter comprising as its characteristic ingredient, a substantial amount of a condensation product of a urea and an aldehyde, together with a glycerin sulphide which itself is not readily soluble in water or alcohol, and a chlorhydrin.

44. A composition of matter comprising as its characteristic ingredient, a substantial amount of a condensation product of a urea and formaldehyde, together with an oxytrimethylene sulphide.

45. A composition of matter comprising as its characteristic ingredient, a substantial amount of a condensation product of urea $CON_2H_4$ and formaldehyde, together with an oxytrimethylene sulphide.

46. A composition of matter comprising as its characteristic ingredient, a substantial amount of a condensation product of thiourea and formaldehyde, together with an oxytrimethylene sulphide.

47. A composition of matter comprising as its characteristic ingredient, a substantial amount of a condensation product of a urea and formaldehyde, together with an oxytrimethylene sulphide and a halohydrin.

48. A composition of matter comprising as its characteristic ingredient, a substantial amount of a condensation product of urea $CON_2H_4$ and formaldehyde, together with an oxytrimethylene sulphide, and a halohydrin.

49. A composition of matter comprising as its characteristic ingredient, a substantial amount of a condensation product of thiourea and formaldehyde, together with an oxytrimethylene sulphide and a halohydrin.

50. A composition of matter comprising as its characteristic ingredient, a substantial amount of a condensation product of urea and thiourea and an aldehyde, together with a glycerin sulphide which itself is not readily soluble in water or alcohol.

51. A composition comprising as its characteristic ingredient, a subtantial amount of condensation products of a urea and an aldehyde, together with a sulphur derivative of glycerine prepared by acting with an inorganic sulphide on a glycerine dichlorohydrine, which sulphur derivative of glycerine is not readily soluble in water or in alcohol, but soluble in an aqueous solution containing a condensation product of a urea and formaldehyde in its water-soluble stage.

52. A composition of matter comprising as its characteristic ingredient, a substantial amount of a condensation product of (a) at least one substance selected from the group urea, thiourea, dicyanodiamide and (b) an aldehyde, together with a sulphur derivative of glycerine prepared by acting with an inorganic sulphide on a dichlorohydrine of glycerine, which sulphur derivative of glycerine is not readily soluble in water or in alcohol, but soluble in an aqueous solution containing a condensation product of a urea and formaldehyde in its water-soluble stage.

53. A composition of matter comprising as its characteristic ingredient, a substantial amount of a condensation product of (a) at least one substance selected from the group urea, thiourea, dicyanodiamide and (b) an aldehyde, together with a halohydrine and together with a sulphur derivative of glycerine prepared by acting with an inorganic sulphide on a dichlorohydrine of glycerine, which sulphur derivative of glycerine is not readily soluble in water or in alcohol, but soluble in an aqueous solution containing a condensation product of a urea and formaldehyde in its water-soluble stage.

54. A composition of matter comprising as its characteristic ingredient, a substantial amount of a condensation product of thiourea and an aldehyde, together with a sulphur derivative of glycerine produced by acting with an inorganic sulphide on a glycerine dichlorohydrine, which sulphur derivative of glycerine is not readily soluble in water or in alcohol, but soluble in an aqueous solution containing a condensation product of a urea and formaldehyde in its water-soluble stage.

55. A composition of matter comprising as its characteristic ingredient, a substantial amount of a condensation product of a urea and formaldehyde, together with a sulphur derivative of glycerine prepared by acting with an inorganic sulphide on a glycerine dichlorohydrine, which sulphur derivative of glycerine is not readily soluble in water or in alcohol, but soluble in an aqueous solution containing a condensation product of a urea and formaldehyde in its water-soluble stage.

56. A composition of matter comprising as its characteristic ingredient, a substantial amount of a condensation product of a urea and formaldehyde together with a halohydrine and together with a sulphur derivative of glycerine prepared by acting with an inorganic sulphide on a glycerine dichlorohydrine, which sulphur derivative of glycerine is not readily soluble in water or in alcohol, but soluble in an aqueous solution containing a condensation product of a urea and formaldehyde in its water-soluble stage.

57. Shaped plastic masses comprising as its characteristic ingredient, a substantial amount of a condensation product of (a) at least one substance selected from the group urea, thiourea, dicyanodiamide and (b) formaldehyde together with 2-oxytrimethylene-1:3-sulphide.

58. A film comprising as its characteristic ingredient, a substantial amount of a condensation product of (a) at least one substance selected from the group urea, thiourea, dicyanodiamide and (b) formaldehyde together with 2-oxytrimethylene-1:3-sulphide.

59. A flexible support coated with a composition of matter comprising a condensation product of (a) at least one substance selected from the group urea, thiourea, dicyanodiamide and (b) formaldehyde together with 2-oxytrimethylene-1:3-sulphide.

60. As new products, artificial masses which contain sulphur and nitrogen and which products, on being decomposed with hydriodic acid, yield isopropyl-iodide.

61. A process of making an intermediate suitable for the production of artificial materials which comprises bringing a condensation product of a urea and an aldehyde, at any stage of the production of such condensation product, into contact with a substantially water-insoluble and substantially alcohol-insoluble sulphur derivative of glycerine selected from the herein described group consisting of oxytrimethylene sulphide and polymerization products thereof.

62. A process of making an intermediate suitable for the production of artificial products which comprises bringing a condensation product of a urea and an aldehyde, at any stage of the production of such condensation product into contact with a sulphur derivative of glycerine selected from the herein described group consisting of sulphides and mercaptans.

LEON LILIENFELD.